May 24, 1966 M. M. CHARD 3,252,477
MOTORIZED CONTROL VALVES
Filed June 13, 1963 9 Sheets-Sheet 1

INVENTOR
Miles M. Chard
BY
Bacon & Thomas
ATTORNEYS

May 24, 1966  M. M. CHARD  3,252,477
MOTORIZED CONTROL VALVES
Filed June 13, 1963  9 Sheets-Sheet 2

INVENTOR
Miles M. Chard
BY
Bacon & Thomas
ATTORNEYS

INVENTOR
Miles M. Chard
BY Bacon & Thomas
ATTORNEYS

INVENTOR
Miles M. Chard
BY Bacon & Thomas
ATTORNEYS

May 24, 1966 M. M. CHARD 3,252,477
MOTORIZED CONTROL VALVES
Filed June 13, 1963 9 Sheets-Sheet 5

INVENTOR
Miles M. Chard
BY Bacon & Thomas
ATTORNEYS

Fig.18.

United States Patent Office 3,252,477
Patented May 24, 1966

3,252,477
MOTORIZED CONTROL VALVES
Miles M. Chard, Newport Beach, Calif., assignor to
Donald G. Griswold, Newport Beach, Calif.
Filed June 13, 1963, Ser. No. 287,708
20 Claims. (Cl. 137—486)

The present invention relates to valves and more particularly to basic, adjustable, motorized control valves, and to the use of such motorized valves as pilot means for controlling a main valve, or as an element or elements of a control system for a main valve.

More particularly, the invention relates to a motorized rate of flow control pilot valve, a motorized pressure relief control pilot valve, and a motorized pressure reducing control pilot valve, each of which can be associated with a main valve and be controlled from a remote point to change the adjustment thereof and correspondingly change the operational function of the main valve associated therewith. All of the motorized control valves embodying the present invention are pressure-responsive and are adjustable to vary the pressure to which they will respond.

One of the important features of the present motorized controls is that they can be used alone, or in various combinations with each other to automatically govern a fluid pressure operated main valve to make it serve more than one purpose. For example, the rate of flow control will automatically maintain a constant rate of flow through a main valve, and it can be combined with a pressure relief control to assure that the main valve also will not open except in the event that the main valve inlet pressure exceeds a predetermined value, and/or a pressure reducing control to also govern the main valve so that the discharge pressure will be constant.

The three basic motorized controls mentioned above, namely (1) the rate of flow control, (2) the pressure relief control, and (3) the pressure reducing control can not only be used with each other in various combinations to control the functions of a fluid pressure operated main valve, as stated, but can be used with additional compatible control components to further vary and control the functions and operations of a main valve.

The motorized control valves of the present invention are particularly important because of the increased use of telemetry in water works and industrial plants to transmit variable data, such as reservoir water levels, water tank levels, water pressures, flow rates, etc., to a centralized location. However, there has been lacking heretofore means by which precise supervisory control of remote valves could be effected from a central location because of the lack of means for controlling or varying the operation of the controls for the remote equipment from such central location. The present invention fills this need and provides means for changing the "set" point of pressure regulating valves, pressure reducing valves, and rate of flow control valves, etc., from a remote point.

The present motorized controls comprise various pressure-responsive valves that are useful as pilot valves and are equipped with an adjusting screw for varying the force exerted by a spring therein to correspondingly vary the pressure at which the valves will respond.

According to the present invention, the motorized control valves are designed so that the adjusting screw is operated by a heavy duty reversible electric motor, which has a reduction gear and an output shaft that turns the adjusting screw at a low speed, for example, about 1¾ r.p.m. when the motor is energized, thus enabling a very fine adjustment to be made. A significantly great advantage of the present structures lies in the fact that the operator can be miles away from a main valve and can effect adjustment of its control means from a monitoring center containing all of the vital data necessary to determine the particular adjustment of the control that may be needed at the moment.

The heavy duty reversible motor serves as a power means to adjust the pilot control valve and is mounted upon a specially designed bracket on which the pilot valve to be controlled is also mounted. This motorized control assembly can be mounted directly upon the main valve to be controlled thereby, or upon a wall or any support convenient to the main valve. The motor itself is of known construction and is designed for continuous energization at full voltage, even in a fully stalled condition, and is also such that it will not heat up the motor windings to a point where insulation failure will occur. A feed back potentiometer (not shown) may be associated with the motorized control, if desired. Such potentiometer is driven by an auxiliary shaft in the reduction gear train associated with the motor to provide a variable resistance which is proportional to the number of turns made by the output shaft of the motor. By indicating the voltage drop across the variable resistance on a suitable volt meter (not shown), it is possible to transmit back to the control center the exact position of the adjustment of the pilot control corresponding to its pressure "setting."

Another feature of the invention resides in the drive coupling means connecting the motor with the adjusting screw of the pilot valve. This coupling means is such that it can be loosened on the output shaft of the motor to which it is normally fixed and manually turned to change the adjustment of the pilot valve screw in the event of electric power failure, or if adjustment of the pilot valve is required in an installation prior to current being available to operate the motor. A precision-built reduction gear train is built into the motor housing and is such that there is no noticeable play, wherefore the pilot valve adjusting screw can be accurately adjusted and maintained in its precise position of adjustment.

The principal object of the invention is to provide motorized control means for a fluid pressure operated main valve that can be governed from a point remote therefrom to change the operating characteristics of said main valve.

Another object is to provide valve means that can be power-adjusted, as desired, from a remote point, but which means is adaptable to permit manual adjustment thereof in the event of lack of power, or power failure.

Another object is to provide basic types of motorized, pressure-responsive pilot valves that are compatible with each other and which can be used along or in various combinations to control a fluid pressure operated main valve to cause it to satisfy a single or a plurality of different, preset operational conditions.

Still another object is to provide a plurality of motorized basic pilot valves that can be associated with a single main valve and independently controlled from a remote point to vary a given operational function of the main valve, without affecting the operational functions of the main valve controlled by other motorized pilot valves associated with the same main valve.

A further object is to provide motorized control valves that can be selectively associated with other components in control systems for main valves to provide main valves that will serve an infinite variety of purposes.

Other features and objects of the invention will be apparent from the following description taken in conjunction with the accompanying drawings, in which:

FIG. 6 is a longitudinal sectional view through the main valve, taken on the line 6—6 of FIG. 2;

Figure 1:
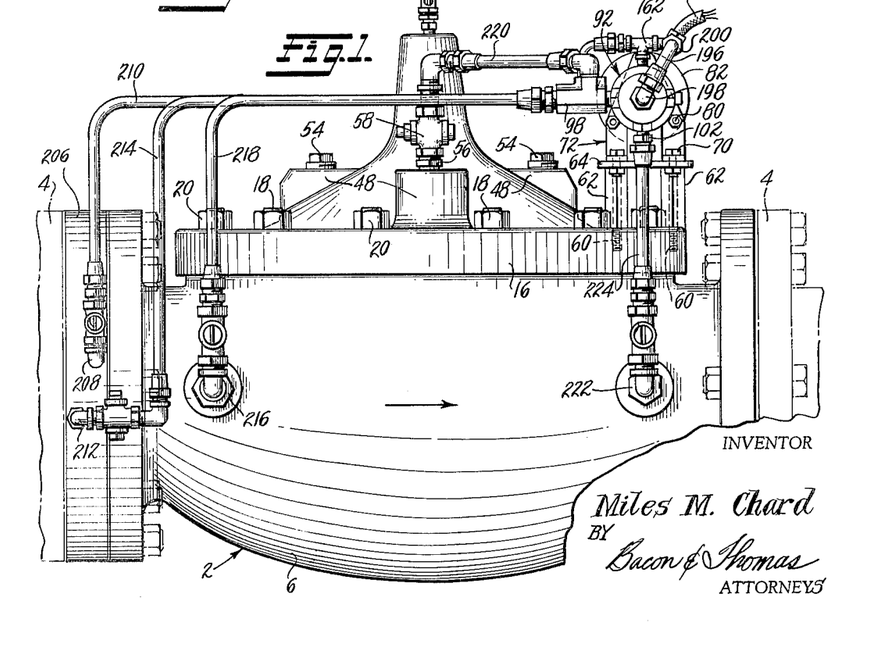
FIG. 1 is an elevational view of a fluid pressure operated main valve having a motorized rate of flow control pilot valve assembly mounted thereon for maintaining a constant rate of flow through the main valve.

Referring now to FIGS. 1 and 6 of the drawings, the main valve is generally identified by the numeral 2 and is adapted to be connected in a pipe 4 in a conventional manner. The main valve 2 comprises a body 6 provided with an inlet chamber 8 and an outlet chamber 10. A partition 12 in the valve body 6 separates the chambers 8 and 10 and serves as a support for a valve seat 14. A cover 16 is secured to the valve body 6 by a plurality of studs 18 and nuts 20, a flexible diaphragm 22 being disposed between the valve body and cover.

A diaphragm supporting plate 24 is disposed in the body 6 below the diaphragm 22 and a supporting plate 26 is disposed in the cover 16 above said diaphragm. A valve stem 28 extends through diaphragm 22 and the supporting plates 24 and 26, and is slidably mounted at its lower end in a guide 30 connected with the seat 14. The upper end of the valve stem 21 is guided in a bushing 32 mounted in the cover 16.

The stem 28 has a shoulder 34 disposed above the guide 30, which serves as an abutment for a disc 36. The supporting plate 24 has an annular groove formed in the lower face thereof in which a sealing ring 38 is disposed and held in place by the outer marginal portion of the disc 36. The stem 28 is threaded in the region of the plate 26 and a self-locking nut 40 is threaded thereon to secure the diaphragm 22, supporting plates 24 and 26, disc 36 and sealing ring 38 in assembled relation. The sealing ring 38 is cooperable with the seat 14 to control the flow of fluid through the main valve 2. A compression spring 41 urges the sealing ring 38 toward the seat 14 against line pressure.

The cover 16 has a central threaded opening 42, which is closed by a conventional valve position indicator 44 cooperable with a rod 46 mounted on the upper end of the valve stem 28.

The valve cover 16 has four bosses 48, each containing a threaded opening 50 communicating with a pressure chamber 52 within said cover. Three of the openings 50 are closed by pipe plugs 54, and the fourth has a conventional fitting 56 mounted therein to which a stop-cock 58 is connected.

Figures 3, 5:
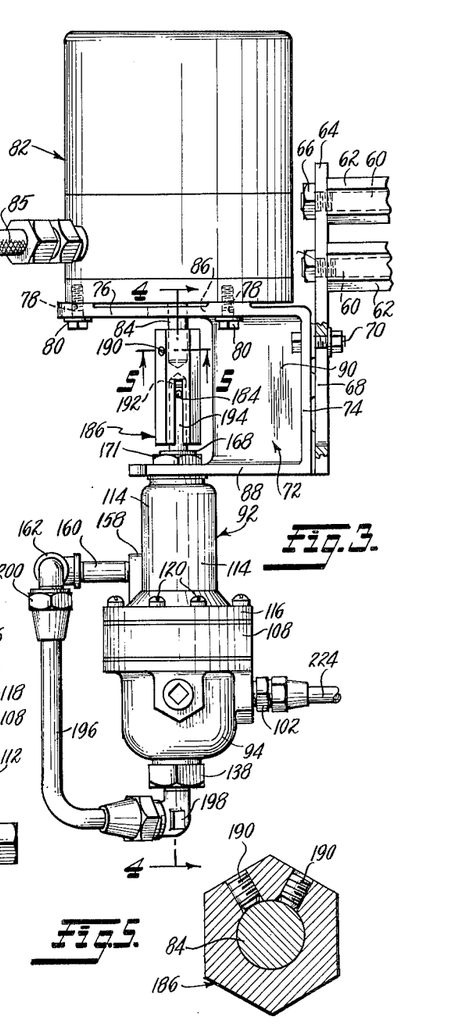
FIG. 3 is an enlarged view of the mounting bracket, motorized control valve assembly, as viewed on the line 3—3 of FIG. 2.
FIG. 5 is an enlarged cross-sectional view, taken on the line 5—5 of FIG. 3, illustrating the means for detachably connecting the drive coupling to the output shaft of the motor.
Figure 7:
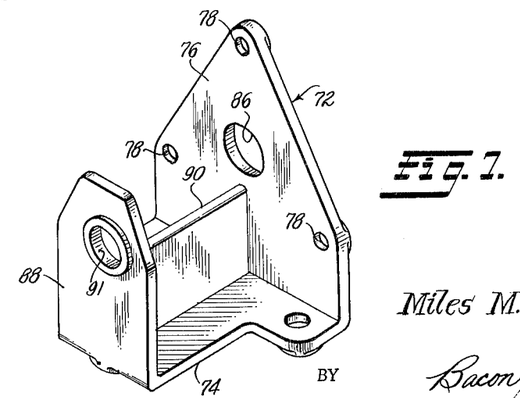
FIG. 7 is a perspective view of the bracket on which both the motor and pilot valve are mounted.

The cover 16 has a pair of studs 60 mounted thereon, which extend through spacers 62 and through openings in a mounting plate 64. Nuts 66 on the studs 60 secure the mounting plate 64 in a position above the cover 16. The mounting plate 64 has elongated slots 68 through which extend bolts 70 for adjustably securing a bracket 72 thereto. The bracket 72 is generally U-shaped, as best shown in FIGS. 3 and 7, and includes a base 74 through which the bolts 70 extend. The bracket 72 also has a generally triangular leg 76, with openings 78 to receive bolts 80 for securing a reversible motor 82 to the leg 76. The motor 82 is a conventional heavy duty, low speed motor, having reduction gearing (not shown) associated therewith, and an output shaft 84 extending from said reduction gearing and through an opening 86 in the bracket leg 76. Current is supplied to the motor through a 3-wire cable 85 connected with a remote reversing switch 87, FIG. 6.

The bracket 72 includes a relatively shorter leg 88 that is connected by a reinforcing web 90 to the base 74 and to the leg 76. The leg 88 has an opening 91 axially aligned with the opening 86 to adapt the leg to have a rate of flow, pressure differential operated, pilot valve 92 mounted thereon in alignment with the motor 82.

Figure 4:
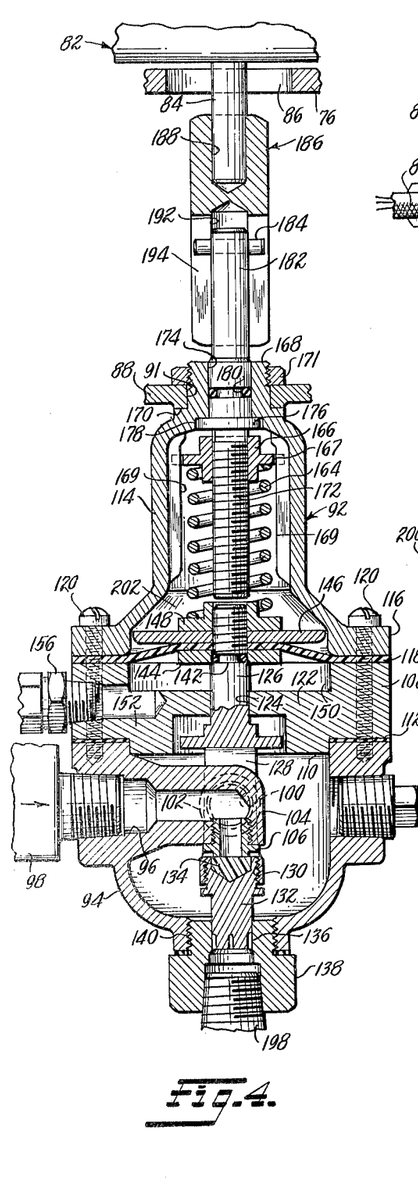
FIG. 4 is an enlarged longitudinal sectional view through the pilot valve, taken on the line 4—4 of FIG. 3.

The details of the interior of the pilot valve 92 are best shown in FIG. 4, wherefrom it will be noted that it includes a body 94 having an inlet passage 96, which is threaded and has a fitting 98 mounted therein. The body 94 also has a threaded outlet opening 100 that has a fitting 102 mounted therein. A partition 104 extends from the inlet opening 98 and has an inverted seat 106 mounted thereon.

An intermediate valve section 108 has a depending boss 110, which projects into the upper end of the body 94. A gasket 112 is disposed between the body 94 and the intermediate section 108 and forms a fluid type seal therebetween. A cover 114 has a flange 116 at its lower end resting upon a diaphragm 118 overlying the margin of the intermediate section 108. A plurality of screws 120 extends through aligned openings in the flange 116, diaphragm 118, the intermediate valve section 108 and the gasket 112, and the lower ends thereof are threaded into suitable holes in the body 94 to assemble the parts in leakproof relation.

The intermediate section 108 has a transverse wall 122 provided with an opening 124 in which a valve stem 126 is slidably mounted. A yoke 128 extends from the stem and surrounds the inner end of the partition 104. The yoke 128 has a threaded opening 130 at its lower end in which the upper end of a stem portion 132 is mounted. A valve disc 134, which is cooperable with the seat 106 for controlling flow through the valve 92, is mounted in a recess in the upper end face of the valve stem portion 132. The stem portion 132 has a lower end face of the same diameter as the stem portion 126 which slides in the opening 124, and is slidably mounted in an opening 136 in a plug 138 mounted in a threaded opening 140 in the valve body 94.

The valve stem portion 126 has a shoulder 142 disposed above the transverse wall 122 which forms an abutment for a lower diaphragm washer 144. A larger washer 146 is mounted upon the stem 126 above the diaphragm 118, and a nut 148 is mounted upon the stem to maintain the diaphragm and the washers 144 and 146 assembled with said valve stem.

The intermediate valve section 108 is recessed to provide a pressure chamber 150 at the lower side of the diaphragm 118, and a radial passage 152 therein communicates with said chamber. A conventional fitting 156 is mounted in the outer end of the passage 152 for a purpose which will be described later. The cover 114 has a threaded boss 158 in which a pipe nipple 160 is mounted and has the stem of a pipe T 162 connected thereto for a purpose which will also be described later. A compression spring 164 is disposed within the cover 114, and its lower end is engaged with the nut 148 and its upper end is engaged with a traveling nut 166. The upper end of the cover 114 has a threaded boss 168 extending from a shoulder 170. The boss 168 fits snugly in the opening 91 in the bracket leg 88, and a jam nut 171 is threaded on the boss to mount the valve 92 on said leg.

The traveling nut 166 is mounted upon an adjusting screw 172, rotatably mounted in an opening 174 in the boss 168. The traveling nut 166 has diametrically opposed notches 167 which receive vertical ribs 169 formed on the interior of the cover 114, whereby the nut 166 is prevented from rotating relative to the cover 114, but is free to travel vertically relative to said cover to vary the force exerted by the compression spring 164 against the diaphragm 118, to move the valve disc 134 away from the seat 106 and thus open the valve 92. The adjusting screw 172 has an integral flange 176 seated in a shouldered recess 178 in the cover 114. The portion of the adjusting screw 172 disposed within the boss 168 is grooved and carries an O-ring 180, which forms a leakproof seal with said boss. The adjusting screw 172 also has a plain upper end 182 that extends beyond the boss 168 and a pin 184 is mounted therein and projects beyond diametrically opposite sides thereof.

The adjusting screw 172 is connected with the motor shaft 84 by a coupling sleeve 186, FIG. 4. The upper end of the coupling 186 has a bore 188 to receive the shaft 84 and carries two set screws 190, FIG. 5, which detachably secure said coupling to said shaft. The lower end of the coupling 186 has a bore 192 to receive the upper end of the adjusting screw 172, and has a longitudinally extending slot 194 intersecting the bore 192, to slidably receive the ends of the pin 184. The slot 194 permits longitudinal movement of the adjusting screw 172 relative to the coupling 186 as the screw is turned in or out of the cover 114 in response to actuation by the motor 82 to effect vertical movement of the nut 166 relative to the threaded portion of the adjusting screw 172, as previously explained.

It will be noted from FIG. 5 that the coupling 186 is hexagonal in transverse cross-section. In the event of lack of operating current for the motor 82, the set screws 190 can be loosened and a wrench applied to the coupling 186 to effect manual adjustment of the screw 172.

Figure 2:
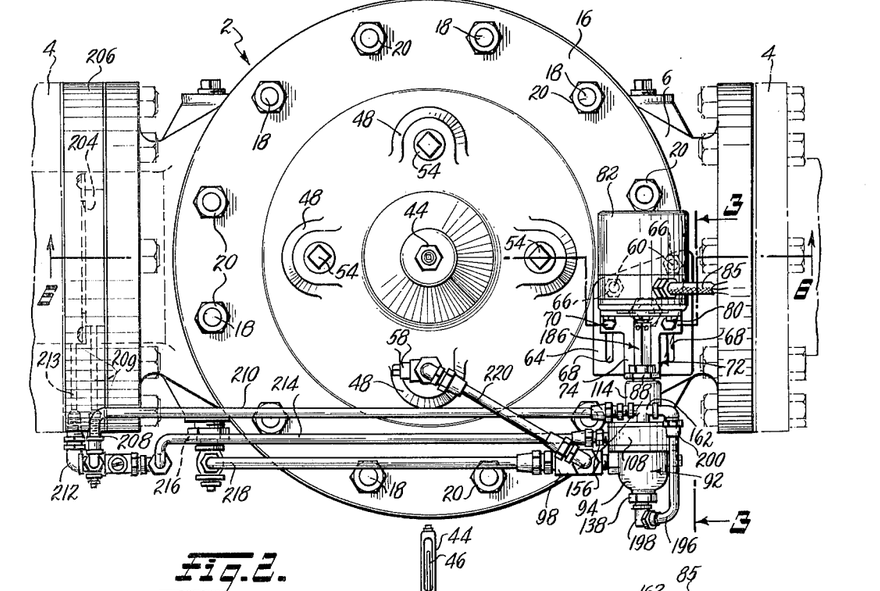
FIG. 2 is a plan view of the main valve and control means shown in FIG. 1.

A pressure equalizing tube 196 has one end thereof connected with a threaded opening in the plug 138 by conventional fitting 198. The opposite end of the equalizer tube 196 is connected with one side of the pipe T 162, which communicates with a chamber 202 in the cover 114, by fitting 200, FIGS. 2 and 3. Thus, any fluid pressure existing in the chamber 202 in the cover 114 is communicated through equalizer tube 196 to the plug 138 and acts against the lower face of the stem portion 132 for balancing the pressure on the opposite ends of the valve stem. Such pressure balancing prevents the occurrence of an unbalanced stem force that would undesirably influence the operation of the pilot valve 92.

The valve 92 is actuated in accordance with the pressure differential across an orifice 204 in an orifice plate 206, FIG. 1, diagrammatically indicated as connected in the pipe 4 on the upstream side of the main valve 2. A fitting 208 is mounted in the outer end of a passage 209 in the orifice plate 206 on the downstream, or low pressure, side of the orifice 204, and has one end of a conductor tube 210 connected thereto. The opposite end of the tube 210 is connected with one side of the T-fitting 162, whereby the pressure on the downstream side of the orifice 204 is communicated to the chamber 202 in the cover 114 of the pilot valve 92. Another fitting 212 is mounted in the outer end of a passage 213 on the upstream, or high pressure, side of the orifice 204 and has one end of a tube 214 connected thereto, the opposite end of which is connected with the fitting 156 communicating with the pressure chamber 150 in the intermediate valve section 108 at the lower side of the diaphragm 118. Thus, the diaphragm 118 is directly responsive to the differential pressure across the orifice 204.

A fitting 216, FIG. 1, is mounted in the main valve body 6 and communicates with the inlet chamber 8 of the main valve. One end of a tube 218 is connected with the fitting 216 and its opposite end is connected with the T-fitting 98 mounted in the inlet opening 96 of the pilot valve 92. A section of tubing 220 connects the stem of the T-fitting 98 with the cock 58, whereby the pressure chamber 52 in the cover 16 of the main valve 2 is in continuous communication with the inlet chamber 8 of the main valve through the tubes 218 and tube 220. It will also be apparent that the tube 218 and the fitting 98 also place the inlet 96 of the pilot valve 92 in continuous communication with the inlet chamber 8 of the main valve 2.

A fitting 222 is mounted in the main valve body 6 in communication with the outlet chamber 10 of said main valve 2, and a section of tubing 224 establishes continuous communication between said outlet chamber and the outlet opening 100 of the pilot valve 92, so that whenever said pilot valve is open to permit operating fluid to flow therethrough, discharge will take place into the outlet chamber of the main valve.

It will be understood that, whether operating fluid from the inlet chamber 8 of the main valve 2 flows through the tubes 218 and 220 to the pressure chamber 52 of the main valve 2, or bypasses said pressure chamber through the pilot valve 92, will depend upon the extent to which the pilot valve has been opened in response to the differential pressure across the orifice 204 and the "set" force exerted by the spring 164. The capacity of the pilot valve 92 is such that operating fluid can be drained from the pressure chamber 52 faster than fluid can flow thereto when conditions so require. Thus, the extent of opening of the main valve 2 is controlled in accordance with the extent of opening of the pilot valve 92, and the pilot valve 92 controls the flow of operating fluid in a manner to either cause the main valve 2 to open further, or to move toward closed position, as required, in order to maintain a desired constant rate of flow through the main valve 2. Such control is effected as follows:

Since the pilot diaphragm 118 is subject to the differential pressure in the pipe 4 on the opposite sides of the orifice 204, the main valve 2 will be caused to function in accordance with the variations that occur in these pressures. The force exerted by spring 164 acting downwardly on the diaphragm 118 combines with the pressure on the downstream side of the orifice 204 and communicated to the pressure chamber 202 through the tube 210, to urge the pilot valve 92 toward open position, and these combined forces are opposed by the pressure on the upstream side of the orifice 204 communicated to the pressure chamber 150 at the lower side of the diaphragm 118 through the tube 214.

Assuming that the orifice 204 is such that a pressure drop or differential of 10#/sq.in. thereacross will provide the desired uniform flow rate in g.p.m. with the orifice 204 producing the required pressure differential, the spring 164 is adjusted so that, when the fluid pressure differential across the orifice 204 and the diaphragm 118 is more than 10#sq.in., the resulting hydraulically produced force is greater than the "set" pressure of the spring 164, and the valve stem 126–132 will be moved upwardly to the closed position, or modulate, to restrict or vary the flow through the main valve 2 as required, in order to maintain the desired uniform flow rate.

The flow rate through the main valve 2 may be changed simply by energizing the motor 82 to rotate the adjusting screw 172 to increase the "set" force that must be overcome by the pressure on the upstream side of the orifice 204. Thus, to increase the flow rate through the main valve 2, the screw 172 is adjusted clockwise to make the nut 166 travel downwardly to increase the compressive force in the spring 164; whereas, to decrease the flow rate, the motor 82 is reversed to rotate the adjusting screw 172 counterclockwise.

For example, the motorized flow rate control pilot valve 92 can be adjusted to vary the constant flow rate through the main valve 2 over its flow range, which may vary from 75 to 250 g.p.m. Any change in the flow rate causes a corresponding change in the pressure differential and the pilot valve 92 responds instantly to counteract this change. Thus, if the flow rate through the main valve 2 should increase due to an increase in the inlet pressure, the differential pressure would, in turn, increase and this added force acting against the spring 164 would act to close the pilot valve 92. Closing of the pilot valve would interrupt the bypassing of operating fluid and result in increasing the pressure in the diaphragm chamber 52 of the main valve 2, thereby forcing the sealing ring 38 toward its seat. This will result in a corrective action modifying the flow through the main valve 2 to restore the flow to its original desired constant rate. Should the differential pressure decrease, the spring 164 will force the pilot valve 92 toward open position to modulate the main valve or permit further opening to maintain the constant rate of flow. The equalizer tube 196 serves at all times to equalize the forces acting on the valve stem areas to effect a more accurate control of the main valve 2.

Should it be desirable to change the rate of flow of fluid through the main valve 2 by either increasing or decreasing the same, this can be effected from a remote point by energizing the motor 82 to rotate the adjusting screw 172 inwardly or outwardly to correspond to the change in rate of flow desired.

Figure 8:
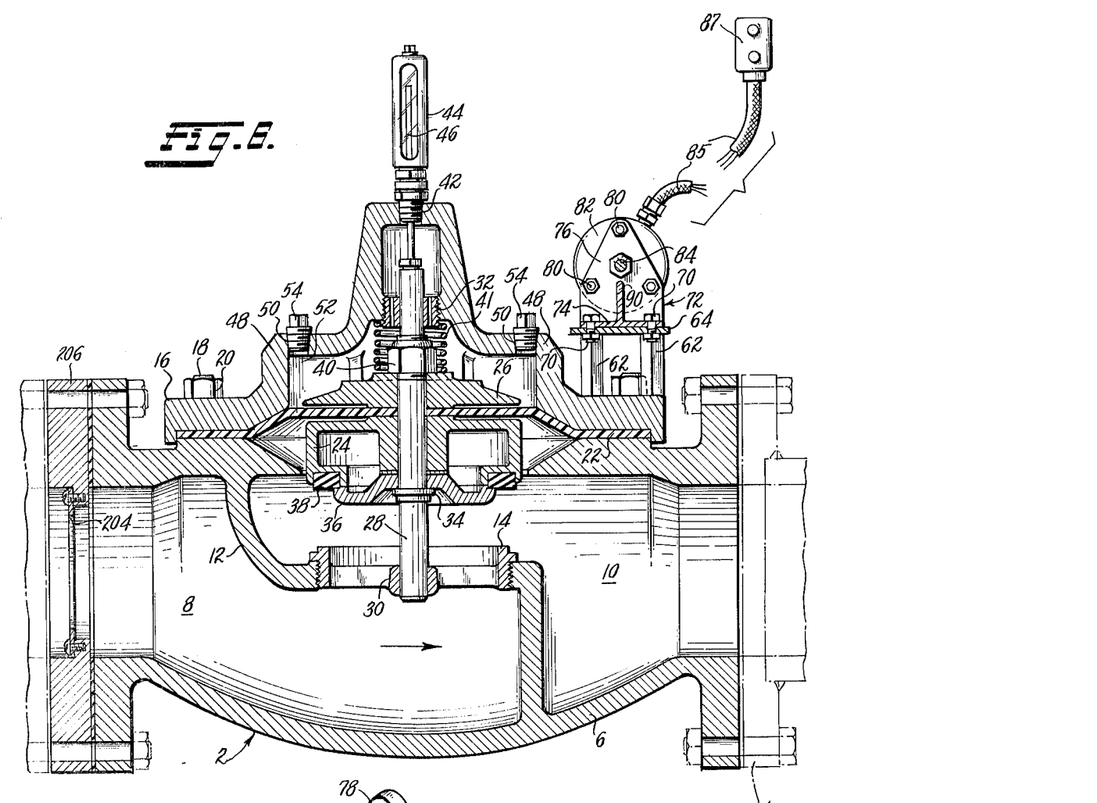
FIG. 8 is an elevational view of a main valve having a motorized pressure relief control pilot valve assembly mounted thereon to cause the main valve to open and relieve excess inlet pressure.
Figure 9:
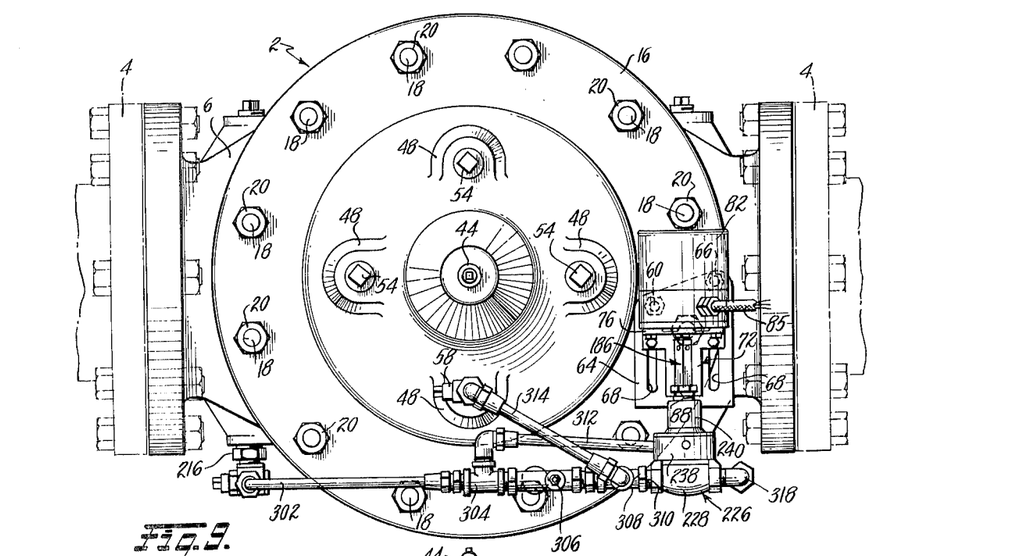
FIG. 9 is a plan view of the main valve and motorized control shown in FIG. 8.
Figure 10:
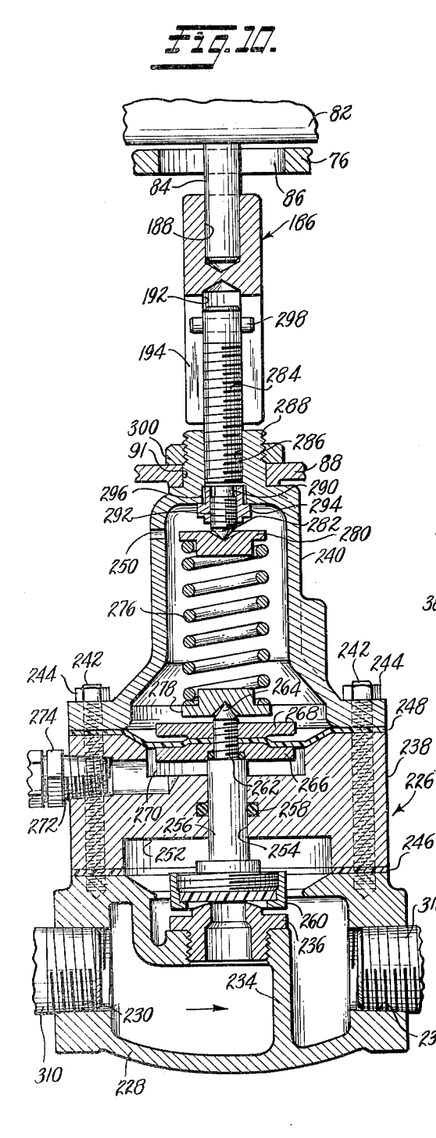
FIG. 10 is an enlarged longitudinal sectional view through the pressure relief pilot valve, taken on the line 10—10 of FIG. 8.

FIGS. 8 and 9 illustrate a pressure relief valve whose operating pressures can be varied in accordance with the present invention by a remotely controlled motorized pilot valve, the details of the pilot valve itself being best shown in FIG. 10. The main valve is identical to the valve 2 previously described and the corresponding parts are identified by the same numerals. This applies to all other main valves referred to hereinafter. Likewise, the reversible motor and the mounting means therefor are identical to the motor 82 in all embodiments disclosed herein, and corresponding parts have been identified by the same reference numerals. The principal difference between the valve shown in FIGS. 1 and 8, lies in the pilot valve and the manner in which it is connected with the main valve, and these will now be described in detail.

Referring to FIG. 10, the pressure relief pilot valve is generally identified by the numeral 226, and comprises a body 228 having a threaded inlet 230 and a threaded outlet 232. A partition 234 within the body carries a seat 236. An intermediate body section 238 and a cover 240 are mounted upon the valve body 228 by studs 242 and nuts 244, with a gasket 246 between the body section 228 and 238 and a diaphragm 248 between the body section 238 and cover 240. The cover 240 has a vent opening 250 communicating with the atmosphere.

The body section 238 has a transverse wall 252 provided with an opening 254 to slidably receive a valve stem 256. The opening 254 is grooved to receive an O-ring 258, which forms a seal around the stem 256. The stem 256 has an enlarged head at its lower end, that carries a sealing disc 260, which cooperates with the seat 236 to control flow through the valve. The upper portion of the steam 256 is reduced and threaded as indicated at 262 and terminates in a conical end 264. A diaphragm supporting washer 266 is mounted on the threaded stem portion 262 below the diaphragm 248 and a combined nut and diaphragm supporting washer 268 is threaded onto the stem portion 262 above the diaphragm 248. Thus, the stem 256 is securely attached to the diaphragm 248.

The body portion 238 has a recess in its upper face that forms a pressure chamber 270 at the lower side of the diaphragm 248. A partially threaded passageway 272 communicates with the chamber 270 and has a conventional fitting 274 mounted therein.

A compression spring 276 is disposed within the cover 240 with its lower end engaged with a washer 278 mounted upon the conical end 264 of the valve stem 256. The upper end of the spring 276 is in contact with a washer 280 that is engaged by the conical end 282 of an adjusting screw 284. The adjusting screw 284 has a right-hand thread and is mounted in a threaded opening 286 in a boss 288 at the upper end of the cover 240. The adjusting screw 284 has a shoulder 290 and a reduced diameter, left-hand threaded extension 292, which terminates in the conical end 282. A threaded thrust washer 294 is mounted upon the threaded portion 292 and the threads at its lower end are peened to lock said washer against rotating relative to the screw 284. The washer 294 includes a reduced upper end that extends into a plain counterbore 296 at the lower end of the threaded opening 286 in the boss 288. The adjusting screw 284 carries a pin 298, which is similar to the pin 184 and cooperates with the coupling 186 in the same manner. The pilot valve 226 is mounted upon the leg 88 of the bracket 72 by a jam nut 300 similar to the nut 171.

Referring now to FIGS. 8 and 9, a tube 302 has one end thereof connected with the fitting 216 communicating with the inlet chamber of the main valve and its opposite end is connected with one end of a pipe T 304. A combined strainer and needle valve 306 has its inlet connected with the other end of the pipe T 304 and its outlet is connected with one end of another pipe T 308. The other end of the pipe T 308 is connected by a pipe nipple 310 with the inlet opening 230 of the pilot valve 226. The stem of the pipe T 304 is connected with one end of a tube 312, the other end of which is connected with the fitting 274 communicating with the chamber 270 at the lower side of the pilot diaphragm 248. Thus, the pressure chamber 270 is subject to, and is in continuous communication with the pressure at the inlet side of the main valve 2 through the tubes 302 and 312. The stem of the pipe T 308 is connected by a tube 314 with the cock 58 mounted on the valve cover 16. Consequently, the pressure chamber 52 of the main valve 2 is also in constant communication with the inlet chamber 8 of the main valve 2 through the tubes 302 and 314. A tube 316 has one end thereof connected with the fitting 222 at the outlet end of the main valve 2 and its other end is connected to a fitting 318 mounted in the threaded outlet opening 232 of the pilot valve 226. Thus, the outlet of the valve 226 is always in communication with the outlet chamber 10 of the main valve 2. When the valve 226 is open, operating fluid can flow therethrough, bypassing the pressure chamber in the valve cover 16.

It will be apparent from the foregoing, that the compression spring 276 tends to continually urge the stem 256 in a direction toward the seat 236 to tend to close the pilot valve 226. Closing action of the valve 226 is opposed by the inlet pressure of the main valve 2, communicated through the tube 302 to the pressure chamber 270 at the lower side of the diaphragm 248. Accordingly, so long as said inlet pressure exceeds the closing force exerted by the spring 276, the pilot valve 226 will be open and will permit operating fluid to bypass the pressure chamber of the main valve. However, should the pressure at the inlet of the main valve drop sufficiently to permit closing of the pilot valve 226, fluid from the inlet chamber of the main valve will be directed through the tubes 302 and 314 to the diaphragm chamber of the main valve to thereby effect closing of the main valve. In this manner, any excess pressure on the upstream side of the main valve 2 will be relieved by opening or modulation of the main valve 2, in accordance with the control exerted by the pressure relief pilot valve 226.

Should it be desired to change the "set" pressure of the pilot valve 226 to cause the main valve 2 to open at a different pressure value, either higher or lower than the existing set pressure, the motor 82 is energized to drive the adjusting screw 284 in the proper direction through the coupling 186. Thus, the motorized pilot valve 226 makes it possible to change the pressure at which the main valve 2 will operate from a remote point.

Figure 11:
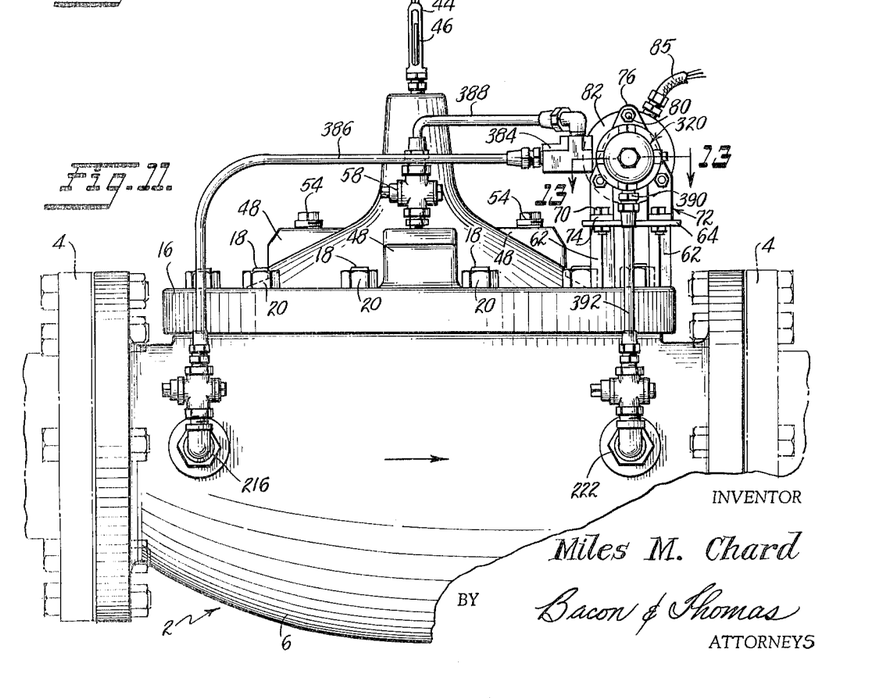
FIG. 11 is an elevational view of a main valve having a motorized pressure reducing pilot valve control assembly thereon to cause the main valve to maintain a constant outlet pressure.
Figure 12:
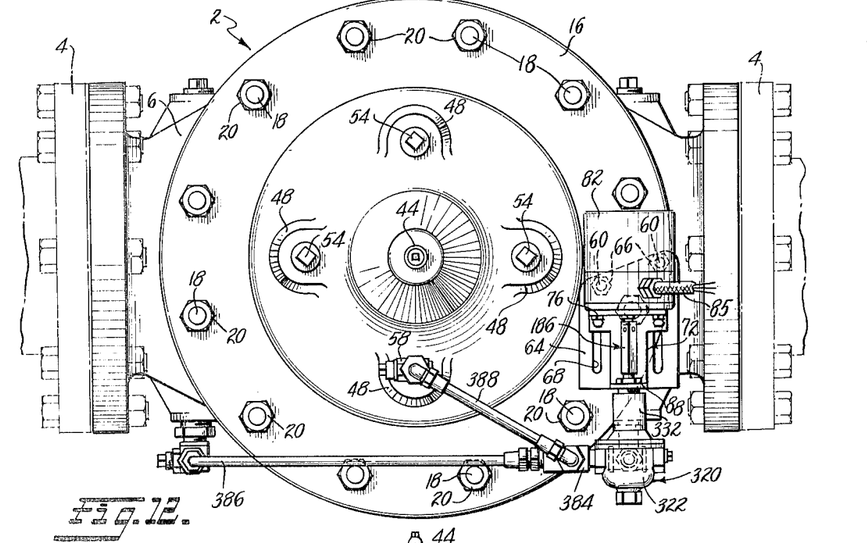
FIG. 12 is a plan view of the main valve and motorized control shown in FIG. 11.

FIGS. 11 and 12 illustrate the main valve 2 provided with a motorized pilot valve 320 for controlling the main valve to function as a pressure reducing valve, that is, maintain a constant outlet pressure. The pressure reducing pilot valve 320 is shown in cross-section in FIG. 13 and comprises a body 322 having a threaded inlet passage 324 and a threaded outlet passage 326. A partition 328 extends inwardly from the inlet opening 324 and has a seat 330 mounted thereon. A cover 332 has a flange 334 engaged with a flexible diaphragm 336 interposed between said flange and the adjacent face of the valve body 322. A plurality of screws 338 extend through openings in the flange 334 and diaphragm 336 and mount the cover 332 and diaphragm 336 in assembled leakproof relation on the valve body 322. A yoke 340 surrounds the partition 328 and carries a projecting valve stem part 342. The yoke 340 also has a threaded opening 344 in which one end of another valve stem part 346 is mounted. The lower end of the stem part 346 is slidably received and guided in a plug 348 mounted in a threaded opening 350 in the valve body 322. The stem part 346 is recessed on its face adjacent the seat 330 to receive a valve disc 352 cooperable with said seat to control the flow or bypassing of operating fluid from the inlet opening 324 to the outlet opening 326 of the valve 320.

Figure 13:
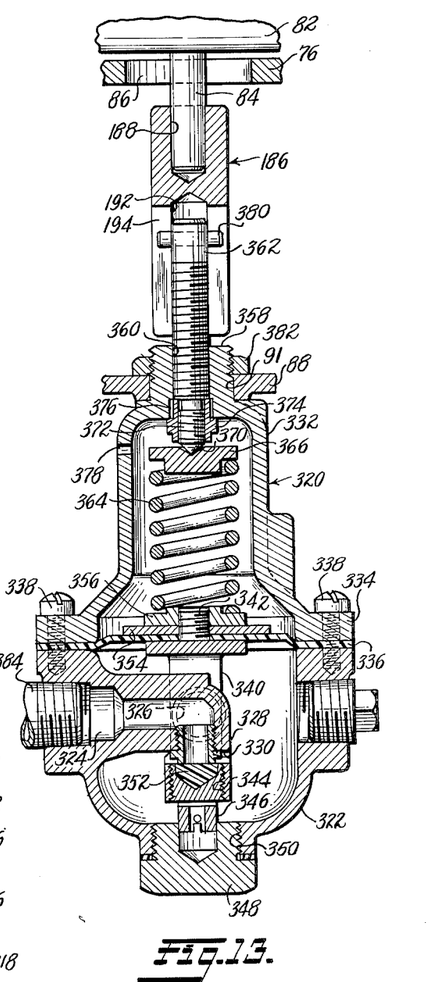
FIG. 13 is an enlarged longitudinal sectional view through the pressure reducing pilot valve, taken on the line 13—13 of FIG. 11.

The valve stem part 342 is threaded and extends through an opening in the diaphragm 336 and through a diaphragm washer 354 and into a combined threaded nut and washer 356 which secures the yoke 340 to the diaphragm 336. The cover 332 carries an externally threaded boss 358 provided with a right-hand threaded opening 360 in which an adjusting screw 362 is mounted. One end of a compression spring 364 is engaged with the nut 356 and the other end is engaged with a disc 366, which is in abutment with the inner conical end 370 of the adjusting screw 362. The lower end of the adjusting screw 362 is reduced and left-hand threaded as indicated at 372 and carries a thrust washer 374, which is non-rotatably peened thereto. The washer 374 includes a portion that extends into a plain counterbore 376 at the lower end of the threaded opening 360. The cover 332 has an opening 378 for venting the interior of said cover to the atmosphere. The adjusting screw 362 carries a pin 380 that extends into the slot 194 in the drive coupling 186.

The boss 358 on the cover 332 extends through the opening 91 in the leg 88 of the bracket 72, and a jam nut 382 is threaded upon said boss to mount the pressure reducing pilot 320 on the bracket 72. The adjusting screw 362 is "set" to provide a predetermined force normally tending to urge the yoke 342 downwardly to effect opening of the pilot valve, with a consequent actuation of the main valve 2 in a manner to reduce the inlet pressure to a desired constant outlet pressure. Any change in this adjustment can be effected from a remote point by driving the motor 82 in the desired direction to either increase or reduce the pressure at which the pilot valve 320 will operate.

The inlet opening 324 of the pilot valve 320 has one end of a T-fitting 384 mounted therein, with the other end thereof connected to one end of a tube 386, FIGS. 11 and 12, the opposite end of which is connected with the fitting 216 communicating with the inlet chamber of the main valve 2. The stem of the T-fitting 384 is connected by a tube 388 with the cock 58 communicating with the diaphragm pressure chamber in the valve cover 16. Thus, the inlet chamber of the main valve 2 is always in communication with the main diaphragm pressure chamber through the tubes 386 and 388.

The outlet 326 of the pilot valve 320 has a fitting 390, FIG. 11, mounted therein to which one end of a tube 392 is connected, the other end of said tube being connected with the fitting 222 communicating with the outlet chamber of the main valve 2. Thus, the outlet of the pressure reducing pilot valve 320 is always in communication with the outlet chamber of the main valve 2, whereby the pressure on the downstream side of the main valve 2 is always effective on the diaphragm 336 to oppose the force of the spring 364 to open the pilot valve 320. Therefore, so long as the downstream pressure is insufficient to overcome the force of the spring 364 holding the pilot valve 320 open, operating fluid will bypass the pressure chamber of the main valve and flow through the pilot valve 320 to the outlet side of the main valve. However, should the pressure in the outlet chamber of the main valve 2 increase sufficiently to overcome the force of the spring 364, the flow of operating fluid through the pilot valve 320 will be cut off or decreased, thereby causing said fluid to flow into the diaphragm pressure chamber of the main valve and either cause the main valve to close, or to modulate, to maintain the desired constant pressure on the downstream side of the main valve.

Should it be desired to change the outlet pressure maintained by the main valve 2, this can be readily effected from a remote point by energizing the motor 82 to change the adjustment of the screw 362 to either increase or decrease the main valve discharge pressure.

It is desirable in many instances to combine the control functions of the motorized control valves 92, 226 and 320 in with other elements, or with each other, in a single main valve, and FIGS. 14 to 18 diagrammatically illustrate examples of main valves and motorized controls for effecting some desirable, combined functions.

Figure 14:
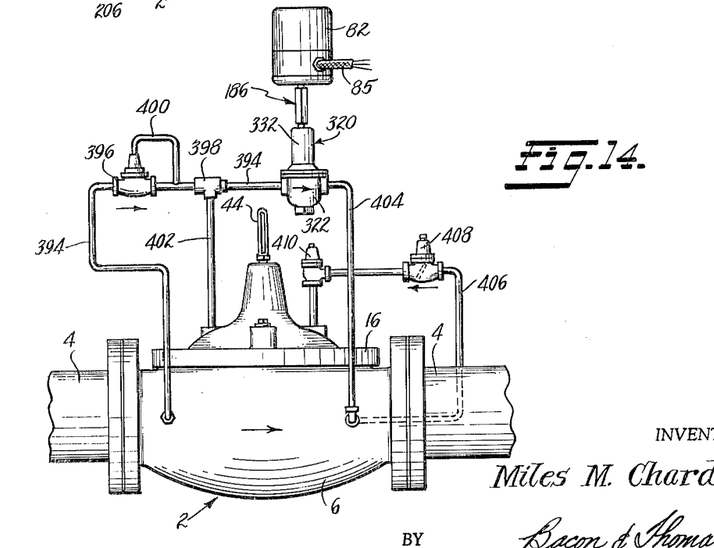
FIG. 14 is a diagrammatic view of a main valve having a control system including a motorized pressure reducing pilot valve and other components connected therewith to maintain a constant downstream pressure and to also cause the main valve to function as an automatic check valve and close, in the event that the downstream pressure exceeds the inlet pressure.

Thus, FIG. 14 illustrates the main valve 2 having the motorized pressure reducing pilot valve 320 associated therewith in combination with other elements for providing a main pressure reducing valve which will also function as an automatic check valve. To this end, the inlet of the main valve 2 is connected by conduit means 394 with the inlet of the pilot valve 320. A small hydraulically operated check valve 396 of known construction is connected in the conduit means 394, and a conventional ejector 398 is connected in said conduit means between the check valve 396 and the pilot valve 320. The check valve 396 is of the diaphragm type and has its diaphragm pressure chamber connected by a tube 400 with the conduit means 394, the arrangement being such, as will appear later, that the check valve 396 will retain the pressure in the cover chamber of the main valve should the inlet pressure drop below the downstream pressure. The ejector 398 is connected with the diaphragm chamber of the main valve by a tube 402. A tube 404 connects the outlet of the pilot valve 320 with the outlet chamber of the main valve 2.

The diaphragm pressure chamber of the main valve 2 is also connected with the outlet chamber of the main valve by conduit means 406, having a swing type check valve 408 connected therein, and an adjustable angle type valve 410 arranged therein between the swing check valve 408 and the valve cover 16, to adjust the closing speed of the check valve operation of the main valve 2.

In the operation of the valve illustrated in FIG. 14, downstream pressure acting on the diaphragm of the pilot valve 320 will keep the pilot valve open and permit bypassing of operating fluid through the conduit means 394, check valve 396 and ejector 398 should variations in demand and pressure changes occur on the downstream side of the main valve. This will cause the pressure in the main diaphragm chamber to correspondingly vary, resulting in corrective action of the main valve to maintain a constant downstream pressure.

If the pressure in the outlet chamber of the main valve 2 is greater than at the inlet side of the main valve, operating fluid will flow into the diaphragm chamber through the conduit means 406, swing check valve 408 and the adjustable angle valve 410 and cause the main valve to function as an automatic check valve, and close. The check valve 396 will close under such condition, and retain pressure in the diaphragm chamber of the main valve. The closing speed of the main valve can be adjusted in accordance with the setting of the angle valve 410. It is important that the valve 410 never be closed completely or the check valve feature of the main valve will fail to function.

The pilot valve 320 can be controlled by the motor 82 to vary the operation of the main valve 2 in accordance with any changes desired in the pressure to be maintained constant on the downstream side of the valve. At the same time, the controls associated with the main valve 2 are such that the main valve will close and function as an automatic check valve in the event of reduction or failure of the upstream pressure, resulting in the downstream pressure being greater than the upstream pressure.

Figure 15:
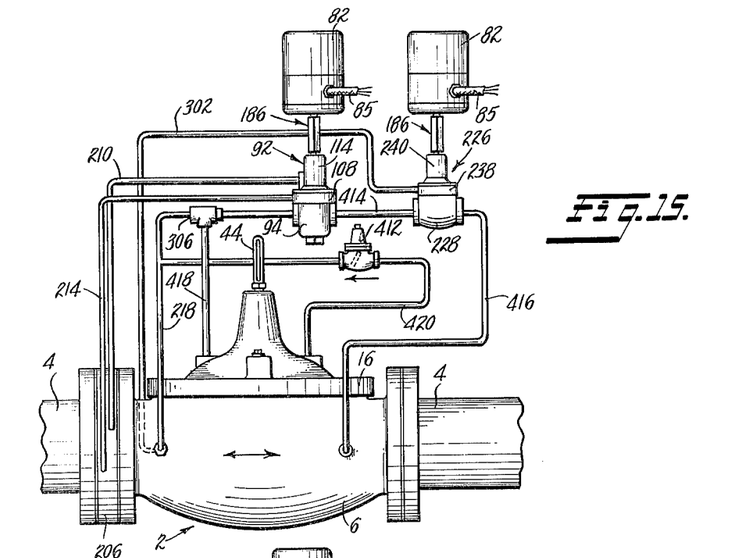
FIG. 15 is a diagrammatic view of a main valve provided with a motorized rate of flow control pilot valve and a motorized pressure relief control pilot valve, together with other components which control the main valve to relieve excess inlet pressure and to maintain and to permit reverse flow through the main valve if the downstream pressure should exceed the inlet pressure.

FIG. 15 illustrates the main valve 2 with a motorized rate of flow control pilot valve 92 and a motorized pressure relief control pilot valve 226 associated therewith, together with a conventional swing check valve 412 for providing a combination rate of flow and back pressure control main valve wherein 2-way flow through the main valve is permitted under certain conditions, the pilot valves 92 and 226 being connected in series. For convenience, the same reference numerals have been applied to the conduits or tubes connecting the rate of flow control pilot valve 92 with the main valve 2 and orifice plate 206 as have been used in FIG. 1, except that the outlet of the pilot valve 92 is connected by a tube 414 with the inlet of the pressure relief pilot valve 226, and the outlet of the latter valve is connected by a tube 416 to the outlet of the main valve 2. Thus, the control exerted by the rate of flow control pilot valve 92 is subject to being modified by the pressure relief control pilot valve 226.

The diaphragm pressure chamber of the valve 226 has been shown connected with the inlet of the main valve 2 by the tube 302, as in FIG. 8. The combined needle valve and ejector 306 is also shown in FIG. 15, but connected in the conduit 218 in advance of the rate of flow control pilot valve 92. The ejector 306 is also shown connected with the cover 16 of the main valve by a tube 418. The swing check valve 412 is mounted in a tube 420 having one end connected with the tube 218 and its other end connected with the cover 16 and communicating with the diaphragm pressure chamber in the main valve 2.

The operation of the back pressure control and 2-way flow, main valve illustrated in FIG. 15 is as follows:

When the pressure at the inlet side of the main valve 2 is below the setting of the pressure relief control pilot valve 226, said valve will be closed. No bypassing flow of operating fluid will then occur through either the pilot valve 92 or the pilot valve 226. The pressure from the inlet of the main valve is then directed into the main valve diaphragm chamber through the tube 218, the combined ejector and needle valve 306, and the tube 418. This pressure will maintain the main valve closed.

When the pressure at the inlet side of the main valve 2 is below the setting of the pressure relief pilot control valve 226, and the pressure at the outlet of the main valve exceeds the inlet pressure, the swing check valve 412 will open to reduce the main valve cover chamber pressure. At the same time the higher pressure in the outlet of the main valve will act directly on the main diaphragm and cause the valve to open. The higher pressure at the outlet side of the main valve will thus effect opening of the main valve for return flow therethrough.

When the pressure at the inlet side of the main valve 2 rises to the setting of the pressure relief pilot valve 226, it will open, and flow of operating fluid through the rate of flow control pilot valve 92 will be permitted, so that operation of the main valve 2 is then under the control of the pilot valve 92 to maintain a constant rate of flow in the normal direction through the main valve.

The effective back pressure can be changed by adjusting the screw on the pressure relief control pilot valve 226 to either increase or decrease the pressure at which the main valve will open. Clockwise rotation of the adjusting screw will increase the setting value, whereas counterclockwise rotation will decrease the setting value. This adjustment can be effected by energizing the motor 82, as previously explained.

Similarly, the rate of flow through the main valve can be changed by adjusting the screw of the valve 92 through operation of the motor 82; turning of the adjustment screw clockwise serving to increase the rate of flow and counterclockwise adjustment decreasing the rate of flow.

Figure 16:
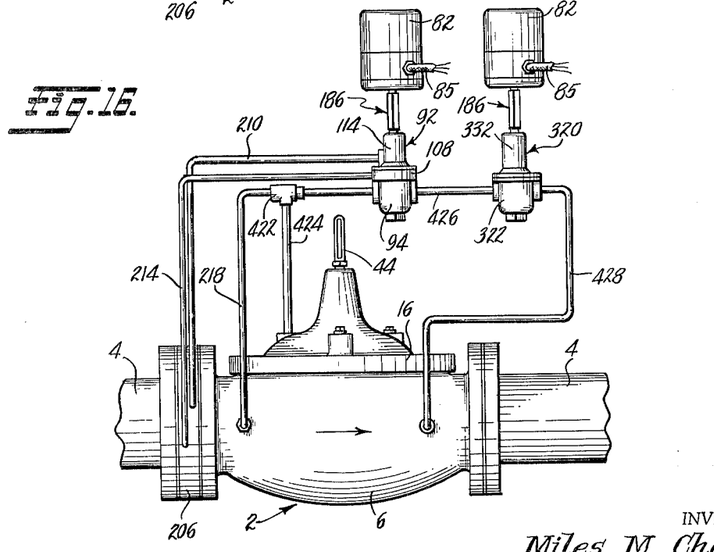
FIG. 16 is a diagrammatic view of a main valve having a motorized rate of flow control pilot valve and a motorized pressure reducing control pilot valve associated therewith to control the main valve to maintain a constant downstream pressure at a constant rate of flow.

FIG. 16 illustrates the main valve 2 provided with a motorized rate of flow control pilot valve 92 and a motorized pressure reducing control pilot valve 320. Here again, the pilot valve 92 is shown connected with the orifice plate 206 and with the inlet of the main valve by tubing identified by the same numerals used in FIG. 1, the tube 218 however having an ejector 422 connected therein and the ejector being connected by a tube 424 with the main diaphragm chamber in the valve cover 16. The pilot valve 92 and the pilot valve 320 are connected in series by tube 426, with the outlet of the pilot valve 320 connected by a tube 428 with the outlet of the main valve 2.

In this arrangement, when the demand on the downstream side of the main valve 2 is less than the rate at which the rate of flow control pilot valve 92 is "set," the pressure reducing control valve 320 will be in command on the main valve 2. The downstream pressure will act on the diaphragm of the pilot valve 320 permitting flow through the ejector 422 and the valve 92, to vary as the pressure changes. This will cause the pressure in the diaphragm chamber of the valve cover 16 to vary, resulting in a corrective action of the main valve to hold a constant downstream pressure.

Should the downstream demand increase beyond the setting of the rate of flow control pilot 92, the increase in the differential pressure across the orifice plate 206 will cause the pilot valve 92 to modulate, restricting the bypass flow of operating fluid through said pilot valve and causing the same to enter the main diaphragm pressure chamber to effect such closing or modulation of the main valve 2 as is required to maintain the constant flow rate for which the pilot valve 92 has been set. Thus, the main valve 2 shown in FIG. 16 will maintain a constant downstream pressure or a constant rate of flow. Either or both of these operational functions can be changed by remote adjustment effected by energization of the motors 82 associated with the respective pilot valves 92 and 320.

Figure 17:
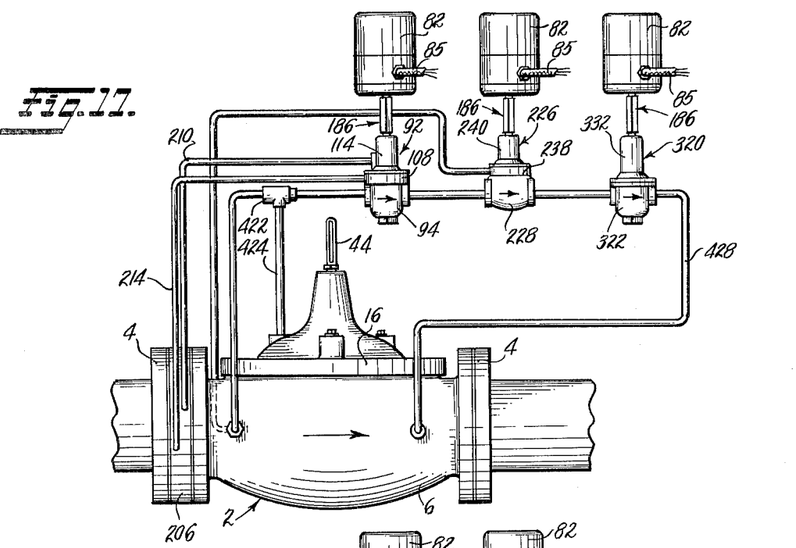
FIG. 17 is a diagrammatic view of a main valve provided with a motorized rate of flow control pilot valve, a motorized pressure relief control pilot valve, and a motorized pressure reducing control pilot valve for controlling the main valve to supply a constant rate of flow at a given pressure and no flow unless the inlet pressure of the main valve is above a given minimum pressure.

FIG. 17 illustrates a main valve 2 combined with control means similar to that shown in FIG. 16, except that an additional motorized control is provided in the form of the pressure relief control pilot valve 226. The tubing connection with the pilot valves 92 and 320 is the same as that illustrated in FIG. 15, except that the pilot valve 226 is interposed in series in the tube 428 between the pilot valves 92 and 320. In operation, when the pressure in the inlet of the main valve 2 is below the setting of the pressure relief control pilot valve 226, said valve is closed. No bypassing flow of operating fluid can then occur through the control system. The full inlet pressure of the main valve 2 is then directed into the diaphragm chamber of the main valve through the tube 424, and main valve 2 is closed.

When the pressure at the inlet side of the main valve 2 rises to the setting of the pressure relief control pilot valve 226, flow of operating fluid from the diaphragm chamber of the main valve can occur through the tube 424 and ejector 422, through the pilot valves 92, 226 and 320, and through the tube 428 to the outlet side of the main valve. Such flow of operating fluid reduces the pressure in the diaphragm chamber of the main valve 2, which then opens to permit flow through the main valve at a constant rate and/or a constant discharge pressure.

When the pressure at the inlet side of the main valve 2 is greater than the setting of the pressure relief control pilot valve 226, as when the main valve 2 is open, and the downstream demand is less than the rate of flow at which the pressure differential control pilot valve 92 is set, the pressure reducing control pilot valve 320 maintains the downstream pressure constant at the value set by said pilot valve. Thus, a constant pressure is maintained on the downstream side of the valve, even though the demand is less than that permissible by the setting of the rate of flow control pilot valve 92.

When the downstream demand increases beyond the setting of the rate of flow control pilot valve 92, the increase in differential pressure across the orifice plate 206 will cause the pilot valve 92 to modulate, restricting the flow of operating fluid therethrough and causing at least a portion thereof to flow into the diaphragm chamber of the main valve to cause the same to modulate and throttle the main valve to maintain the desired constant rate of flow. It will be understood that the motor 82 associated with each of the pilot control valves 92, 226 and 320 can be independently operated from a remote point to modify the operating characteristics of the main valve controlled by each of these pilot valves, as desired.

Figure 18:
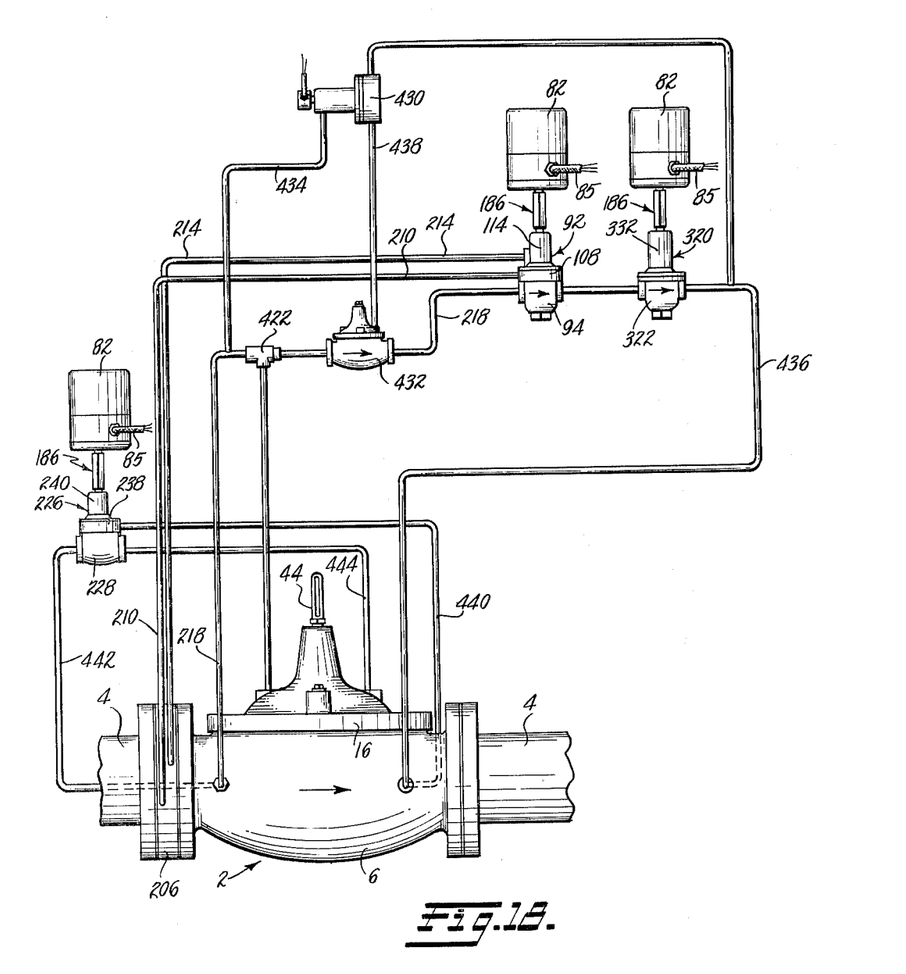
FIG. 18 is a diagrammatic view of a main valve provided with a motorized rate of flow control pilot valve, a motorized pressure reducing control pilot valve, and a motorized pressure relief control pilot valve, together with a manually operable, solenoid shut-off valve for effecting closing of the main valve independently of the motorized controls.

FIG. 18 illustrates the main valve 2 having a control system connected therewith containing the three different basic motorized control valves 92, 226 and 320 shown in FIG. 17 together with additional control means in the form of a 3-way solenoid-operated shut-off valve 430, and an auxiliary but smaller valve 432 similar to the main valve 2 arranged to function as a shutoff valve in the conduit means 218 between an ejector 422 and the rate of flow control pilot valve 92. The solenoid valve 430 is disposed in a conduit 434 connected at one end with the conduit 218 and connected at its other end with a conduit 436 extended from the outlet of the pressure reducing pilot valve 320 to the outlet of the main valve 2. The solenoid valve 430 is also connected by a tube 438 with the diaphragm pressure chamber of the valve 432 for controlling the supply and exhaust of operating fluid to said valve.

The pressure relief pilot valve 226 has its pressure chamber connected with the outlet of the main valve 2 by a tube 440. The inlet thereof is connected by a tube 442 with the inlet of the main valve 2 and its outlet is connected by a tube 444 with the cover of said main valve. Otherwise, the tubing connections between the main valve 2 and the rate of flow control valve 92 are the same and have been identified by the same numerals.

The solenoid valve 430 must be energized to open and its arrangement in the system is such that the main valve 2 will remain closed, until said solenoid valve has been opened. The main valve 2 is controlled by the rate of flow control pilot valve 92, or by the pressure reducing control pilot valve 320, depending upon downstream conditions.

When the downstream demand is less than the rate of flow at which the pilot valve 92 is "set," the pressure reducing pilot valve 320 maintains the downstream constant. When the downstream demand increases beyond the setting of the rate of flow pilot valve 92, the increased differential pressure across the orifice plate 206 will cause the valve 92 to modulate and restrict the bypassing of operating fluid around the main valve 2 and cause the same to flow to the diaphragm chamber of said main valve, thereby resulting in modulating of said main valve to maintain the desired constant flow rate.

When the downstream pressure rises to the set pressure of the pressure relief pilot valve 226, it will open, admitting upstream pressure into the diaphragm chamber of the main valve through the tubes 442 and 444. This will immediately tend to cause the main valve to modulate to maintain the desired normal discharge pressure constant.

Deenergizing of the solenoid control valve 430 will direct pressure to the cover of the auxiliary control valve 432, closing the same. This action will result in directing the flow of operating fluid from the inlet side of the main valve 2, into the diaphragm chamber of the main valve, closing the main valve and overriding the controls otherwise exerted by the pilot valves 92, 226 and 320.

The operating characteristics of the main valve 2 of FIG. 18 can be changed by energizing the motors 82 associated with any one of the pilot control valves 92, 226 and 320, from a remote point as previously described.

It will be understood that the various basic, motorized control valves disclosed herein can be modified and combined with each other in various combinations, and employed with other elements in a main valve control system, other than as specifically disclosed therein, without departing from the principles of the invention or the scope of the annexed claims.

I claim:

1. A motorized control valve assembly, comprising: an electric motor including an output shaft; bracket means having a base and a pair of spaced walls extending from said base; means mounting said motor upon one of said walls; a pressure-responsive valve, including: a housing; flow control means in said housing; adjustable biasing means in said housing arranged to exert force on said flow control means to establish the pressure to which said valve will respond; and a rotatable adjusting member carried by said housing and operable upon rotation thereof to adjust the force exerted by said biasing means to thereby vary the pressure to which said valve will respond, said adjusting member including a portion engageable from the exterior of said housing; means mounting said valve on the other wall of said bracket means, with said output shaft aligned with said adjusting member; and means directly interconnecting said motor shaft and said engageable portion of said adjusting member, whereby the adjusting member can be actuated by energizing said motor.

2. A motorized control valve assembly comprising: a reversible electric motor including an output shaft;

bracket means having a base and a pair of spaced walls extending from said base; means mounting said motor upon one of said walls; a pressure-responsive pilot valve, including: a housing; flow control means in said housing; adjustable biasing means in said housing arranged to exert force on said flow control means to establish the pressure to which said valve will respond; and a rotatable adjusting screw carried by said housing and operable upon rotation thereof to adjust the force exerted by said biasing means to thereby vary the pressure to which said valve will respond, said adjusting screw including a portion engageable from the exterior of said housing; means mounting said pilot valve on the other wall of said bracket means with said adjusting screw in axial alignment with said motor shaft; and drive means directly connecting said motor shaft with said engageable portion of said adjusting screw, said drive means being arranged and constructed to permit axial movement of said adjusting screw relative to said drive means while said drive means is rotating.

3. A motorized control valve assembly, comprising: a reversible electric motor including a low speed output shaft; bracket means having a base and a pair of spaced walls extending from said base; means mounting said motor on one of said walls; a pressure-responsive pilot valve, including: a housing; flow control means in said housing; adjustable biasing means in said housing arranged to exert force on said flow control means to establish the pressure to which said valve will respond; an externally threaded boss on said housing; and an adjusting screw rotatably mounted in said boss and operable upon rotation thereof to adjust the force exerted by said biasing means to thereby vary the pressure to which said valve will respond, said adjusting screw including a portion engageable from the exterior of said housing, said other wall having an opening therein, said boss extending through said last-mentioned opening, with said adjusting screw disposed in axial alignment with said motor shaft; means threaded upon said boss and securing said pilot valve to said other wall of said bracket means; and a coupling member directly connecting said motor shaft with said engageable portion of said adjusting screw.

4. A motorized control valve assembly, comprising: a reversible electric motor including a low speed output shaft; a generally U-shaped bracket having a base and a pair of legs extending from said base, said legs having aligned openings therein; means mounting said motor on one of said legs with said output shaft extending through the opening in said one leg; a pressure-responsive pilot valve including: a housing; flow control means in said housing; adjustable biasing means in said housing arranged to exert force on said flow control means to establish the pressure to which said valve will respond; an externally threaded boss on said housing; and an adjusting screw rotatably mounted in said boss and operable upon rotation thereof to adjust the force exerted by said biasing means to thereby vary the pressure to which said valve will respond, said adjusting screw including a portion engageable from the exterior of said housing, said boss extending through the opening in the other leg of said bracket, with said adjusting screw disposed in axial alignment with said motor shaft; means threaded upon said boss and securing said pilot valve to said other leg of said bracket; and a coupling member directly connecting said motor shaft with said engageable portion of said adjusting screw.

5. A motorized control valve assembly, comprising: a reversible electric motor including a low speed output shaft; a generally U-shaped bracket having a base, a pair of legs extending from said base, and a reinforcing web joining said legs and base together, said legs having aligned openings therein; means mounting said motor upon one of said legs with said output shaft extending through the opening in said one leg; a pressure-responsive pilot valve including: a housing; flow control means in said housing; adjustable biasing means in said housing arranged to exert force on said flow control means to establish the pressure to which said valve will respond; and a rotatable adjusting screw carried by said housing and operable upon rotation thereof to adjust the force exerted by said biasing means to thereby vary the pressure to which said valve will respond, said adjusting screw including a portion engageable from the exterior of said housing; means mounting said pilot valve upon the other leg of said bracket with said engageable portion of said adjusting screw extending through the opening in said other leg and aligned with said output shaft; and drive means directly connecting said motor shaft with said engageable portion of said adjusting screw, said drive means and said engageable portion of said adjusting screw having cooperating means providing for axial movement of said adjusting screw relative to said motor shaft while said shaft is rotating.

6. A motorized control valve assembly, comprising: a reversible electric motor including a low speed output shaft; a generally U-shaped bracket having a base and a pair of legs extending from said base; means mounting said motor upon one of said legs, the other leg of said bracket having an opening axially aligned with said shaft; a pressure-responsive pilot valve, including: a housing; flow control means in said housing; adjustable biasing means in said housing arranged to exert force on said flow control means to establish the pressure to which said valve will respond; and a rotatable adjusting screw carried by said housing and operable upon rotation thereof to adjust the force exerted by said biasing means to thereby vary the pressure to which said valve will respond, said adjusting screw including a portion engageable from the exterior of said housing; means mounting said pilot valve on said other leg with said adjusting screw aligned with said output shaft, said engageable portion of said adjusting screw having a pin therethrough; a coupling directly connecting said output shaft with said engageable portion of said adjusting screw; and means securing said coupling to said output shaft, said coupling having slot means in which the pin of said adjusting screw is received, whereby said adjusting screw can move axially with respect to said coupling, upon rotation of said output shaft.

7. A motorized control valve assembly, comprising: a reversible electric motor including a low speed output shaft; a generally U-shaped bracket having a base and a pair of legs extending from said base; means securing one of said legs to said motor, said one leg having an opening through which said output shaft extends, the other leg of said bracket having an opening axially aligned with the opening in said one leg; a pressure-responsive pilot valve, including: a housing; flow control means in said housing; adjustable biasing means in said housing arranged to exert force on said flow control means to establish the pressure to which said valve will respond; an externally threaded boss on said housing; said boss extending through the opening in said other bracket leg; an adjusting screw rotatably mounted in said boss and operable upon rotation thereof to adjust the force exerted by said biasing means to thereby vary the pressure to which said valve will respond, said adjusting screw including a portion engageable from the exterior of said housing, said portion having a pin extending therethrough; means threaded upon said boss and securing said pilot valve to said other leg of said bracket with said adjusting screw aligned with said output shaft; a coupling connecting said output shaft with said engageable portion of said adjusting screw; and means detachably securing said coupling to said output shaft, said coupling having slots in which the pin of said adjusting screw is received, whereby said adjusting screw can move axially with respect to said coupling, upon rotation of said output shaft.

8. A motorized control valve assembly, comprising:

a reversible electric motor including a low speed output shaft; a generally U-shaped bracket having a base and a pair of legs extending from said base, said legs having aligned openings therein; means mounting said motor on one of said legs with said output shaft extending through the opening in said one leg; a pressure-responsive pilot valve, including: a housing; flow control means in said housing; adjustable biasing means in said housing arranged to exert force on said flow control means to establish the pressure to which said valve will respond; an externally threaded boss on said housing, said boss extending through the opening in the other leg of said bracket; and an adjusting screw rotatably mounted in said boss and operable upon rotation thereof to adjust the force exerted by said biasing means to thereby vary the pressure to which said valve will respond, said adjusting screw including a portion engageable from the exterior of said housing and being aligned with said output shaft; means threaded upon said boss and securing said valve to said other leg of said bracket; a coupling member between said motor shaft and said engageable portion of said adjusting screw; and means detachably securing one end of said coupling member to said motor shaft, said coupling member having elongated slot means, and said engageable portion of said adjusting screw having a pin cooperating with said slot means to provide a driving connection therebetween and to provide for axial movement of said adjusting screw relative to said coupling member.

9. In combination: a main valve having an inlet, an outlet, and fluid pressure operable means controlling the flow of fluid from said inlet to said outlet; and a motorized control for said main valve including: a pressure-responsive pilot valve connected with said main valve for controlling the application of operating fluid to said fluid pressure operable means to maintain a given operating function of said main valve, said pilot valve including: a housing; flow control means within said housing; adjustable biasing means in said housing arranged to exert force on said flow control means to establish the pressure to which said pilot valve will respond; and an adjusting screw carried by said housing and operable upon rotation thereof to adjust the force exerted by said biasing means to thereby vary the pressure to which said pilot valve will respond, said adjusting screw including a portion engageable from the exterior of said housing; an electric motor including a low speed output shaft; bracket means connecting together said pilot valve and motor, with said shaft in axial alignment with said adjusting screw; and means connecting said shaft directly to said engageable portion of said adjusting screw for changing the adjustment thereof upon energization of said motor.

10. The combination defined in claim 9, wherein the bracket means is mounted upon said main valve.

11. In combination: a main valve including a body and a cover, said main valve having an inlet, an outlet, and fluid pressure operable means controlling the flow of fluid from said inlet to said outlet; and a motorized control assembly for controlling said main valve including: a pressure-responsive pilot valve connected with said main valve for controlling the application of operating fluid to said fluid pressure operable means to maintain a given operating function of said main valve, said pilot valve including: a housing, flow control means within said housing, adjustable biasing means in said housing arranged to exert force on said flow control means to establish the pressure to which said pilot valve will respond, and an adjusting screw carried by said housing and operable upon rotation thereof to adjust the force exerted by said biasing means to thereby vary the pressure to which said pilot valve will respond, said adjusting screw including a portion engageable from the exterior of said housing, a reversible electric motor including a low speed output shaft, a generally U-shaped bracket having a base and a pair of legs extending from said base, means securing said pilot valve to one of said legs, means securing said motor to the other leg with the motor shaft axially aligned with the adjusting screw, means connecting said shaft directly to said engageable portion of said adjusting screw for changing the position thereof upon energization of said motor, and means mounting said bracket upon the main valve.

12. The combination defined in claim 11, wherein the means for mounting the bracket upon the main valve comprises studs extending from the cover, spacers mounted upon the studs, a mounting plate on said studs engaged with the end of the spacers remote from the valve cover, nuts on said studs securing said mounting plate and spacers to said cover, said mounting plate having elongated slots formed therein, and bolts extending through said slots and adjustably securing said bracket to said mounting plate.

13. A main valve including an inlet and an outlet and fluid pressure operable means controlling flow therebetween, and control means for said main valve, comprising: a plurality of pressure-responsive pilot valves connected in series in conduit means interconnected in bypassing relation with the inlet and outlet of said main valve to control the application of operating fluid to said fluid pressure operable means, a branch tube connected with said conduit means at a point in advance of the pilot valve nearest the inlet of said main valve, and leading to said fluid pressure operable means, each of said pilot valves being designed to provide a different operating function of said main valve, each of said pilot valves including: a housing; flow control means within said housing; adjustable biasing means in said housing arranged to exert a force on said flow control means to establish the pressure to which said pilot valve will respond; and a rotatable adjusting element carried by said housing and operable upon rotation thereof to adjust the force exerted by said biasing means to thereby vary the pressure to which said pilot valve will respond, said adjusting element including a portion engageable from the exterior of said housing; a separate remotely controlled electric motor for each pilot valve, each motor including an output shaft; a bracket for each motor, for connecting the motor to its associated pilot valve with the output shaft aligned with said adjusting element; and coupling means directly connecting each motor output shaft with the engageable portion of its associated adjusting element, whereby said pilot valves can be independently adjusted from a remote point, as desired.

14. A main valve as defined in claim 13, wherein the first of the series-connected pilot valves is controlled by means responsive to the differential pressure across an orifice plate and controls the main valve to provide a constant rate of flow of fluid therethrough, and wherein the last of the series-connected pilot valves is responsive to move toward closed position upon increasing outlet pressure of said main valve to control said main valve to additionally maintain a constant discharge pressure.

15. A main valve and control means as defined in claim 14, wherein a three-way solenoid-operated valve is connected in a conduit arranged in bypassing relation to the pilot valves, and wherein a fluid pressure operable check valve is connected in the conduit means between the branch tube and the first of the pilot valves, and wherein the check valve has a pressure chamber connected by a conduit with said solenoid valve, said solenoid valve being arranged when open to bypass operating fluid around said check valve and pilot valves, and when closed to direct operating fluid to said check valve to close it, whereby said solenoid valve can be remotely controlled to shut off the main valve independently of the pilot valves.

16. In combination: a main valve having an inlet, an outlet and fluid pressure operable means controlling the flow of fluid from said inlet to said outlet; a pressure responsive pilot valve connected with said main valve for controlling the application of operating fluid to said fluid pressure operable means, to maintain a given operating function of said main valve, said pilot valve including: a housing; flow control means in said housing; adjustable biasing means in said housing arranged to exert force on said flow control means to establish the pressure to which said pilot valve will respond; and a rotatable adjusting element carried by said housing and operable upon rotation thereof to adjust the force exerted by said biasing means to thereby vary the pressure to which said pilot valve will respond, said rotatable adjusting element including a portion engageable from the exterior of said housing; and remotely controlled means connected with the engageable portion of said rotatable adjusting element for moving the same from one position to another, said means including: a motor having an output shaft; a bracket connecting said motor to said pilot valve with said output shaft aligned with said adjusting element; and a coupling element releasably secured at one end thereof to said motor output shaft and drivingly engaged at the other end thereof with said engageable portion of said rotatable adjusting element, whereby when said coupling element is secured to said output shaft said adjusting element will be rotated upon actuation of said motor, and when said coupling element is released from said output shaft said adjusting element can be rotated by manually rotating said coupling element.

17. The combination defined in claim 16, wherein said adjusting element is a screw, said coupling sleeve and said screw having cooperating means providing for axial movement of said screw relative to said motor output shaft while said shaft is rotating.

18. The combination as recited in claim 16, wherein said pilot valve is responsive to the differential pressure across an orifice plate positioned on the inlet side of said main valve, said pilot valve being connected with said main valve for controlling the application and/or bypassing of operating fluid to said main valve to provide a constant rate of flow therethrough.

19. The combination defined in claim 16, wherein said pressure-responsive pilot valve is so constructed and interconnected with said main valve as to control said main valve to provide a constant pressure on the downstream side of said main valve, said pilot valve being connected with the inlet and outlet of said main valve for controlling the application and/or bypassing of operating fluid to said main valve to maintain the aforesaid constant downstream pressure.

20. A fluid pressure operable main valve as defined in claim 19, wherein a conduit connects the main valve inlet with the pilot valve inlet and a branch tube connects said conduit with a chamber for fluid for actuating the fluid pressure operable means of said main valve, and wherein a check valve is interposed in said conduit between the main valve inlet and said branch tube and is arranged to allow flow in a direction toward said pilot valve, and wherein a second conduit connects the outlet of said main valve with said chamber and a check valve is connected in said second conduit to allow flow only in a direction toward said chamber, whereby when said pilot valve is closed and the outlet pressure of said main valve exceeds the inlet pressure, said main valve will automatically close.

References Cited by the Examiner

UNITED STATES PATENTS

| | | | |
|---|---|---|---|
| 2,665,711 | 1/1954 | Parks | 251—61 |
| 2,707,970 | 5/1955 | Hughes | 137—489 |
| 2,770,442 | 11/1956 | Demay | 251—61 |
| 2,771,905 | 11/1956 | Griswold | 137—489 X |
| 2,860,662 | 11/1958 | Gres et al. | 137—469 |
| 2,868,226 | 1/1959 | Griswold | 137—489 |
| 2,888,032 | 5/1959 | Griswold | 137—486 |
| 2,991,796 | 7/1961 | Griswold | 137—489 |
| 3,106,936 | 10/1963 | Trautman | 137—491 X |

MARTIN P. SCHWADRON, *Acting Primary Examiner.*

M. CARY NELSON, *Assistant Examiner.*